United States Patent
Farrar et al.

(10) Patent No.: US 11,549,380 B2
(45) Date of Patent: Jan. 10, 2023

(54) CONTOUR WEAVING TO FORM AIRFOIL

(71) Applicant: Raytheon Technologies Corporation, Farmington, CT (US)

(72) Inventors: Bryan H. Farrar, West Hartford, CT (US); Howard J. Liles, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/076,043

(22) Filed: Oct. 21, 2020

(65) Prior Publication Data

US 2021/0156266 A1 May 27, 2021

Related U.S. Application Data

(60) Provisional application No. 62/938,625, filed on Nov. 21, 2019.

(51) Int. Cl.
| | |
|---|---|
| *F01D 5/28* | (2006.01) |
| *B29C 70/32* | (2006.01) |
| *B29C 70/24* | (2006.01) |
| *B29L 31/08* | (2006.01) |

(52) U.S. Cl.
CPC .............. *F01D 5/282* (2013.01); *B29C 70/24* (2013.01); *B29C 70/32* (2013.01); *F01D 5/284* (2013.01); *B29L 2031/08* (2013.01); *F05D 2230/31* (2013.01); *F05D 2300/6033* (2013.01)

(58) Field of Classification Search
CPC ......... F01D 5/282; F01D 5/284; B29C 70/24; B29L 2031/08
See application file for complete search history.

(56) References Cited

U.S. PATENT DOCUMENTS

| | | | | |
|---|---|---|---|---|
| 7,600,979 | B2 * | 10/2009 | Steibel | F01D 5/282 |
| | | | | 416/229 A |
| 9,011,085 | B2 | 4/2015 | Suciu et al. | |
| 9,103,214 | B2 * | 8/2015 | McCaffrey | F01D 5/147 |
| 9,777,585 | B2 | 10/2017 | Drane | |
| 10,006,301 | B2 | 6/2018 | Riehl | |

(Continued)

FOREIGN PATENT DOCUMENTS

EP 3284593 2/2018

OTHER PUBLICATIONS

European Search Report for European Patent Application No. 20208859.7 completed Feb. 25, 2021.

*Primary Examiner* — Michael L Sehn
(74) *Attorney, Agent, or Firm* — Carlson, Gaskey & Olds, P.C.

(57) ABSTRACT

A method of fabricating an airfoil includes drawing a continuous woven fabric ply over a contoured surface that has a geometry that is analogous to a geometry of an airfoil. The continuous woven fabric ply takes the geometry of the contoured surface to thereby form a contoured continuous woven fabric ply. The contoured continuous woven fabric ply is then wrapped around an airfoil tool to produce an airfoil preform. The airfoil tool has a geometry that is analogous to the airfoil. The contoured continuous woven fabric ply takes the geometry of the airfoil tool. The airfoil preform is then densified with a ceramic matrix to produce a ceramic matrix composite airfoil.

20 Claims, 5 Drawing Sheets

(56) References Cited

U.S. PATENT DOCUMENTS

| | | | |
|---|---|---|---|
| 2011/0206522 A1* | 8/2011 | Alvanos | F01D 5/3007 |
| | | | 428/68 |
| 2014/0010662 A1* | 1/2014 | Duelm | F01D 5/28 |
| | | | 416/230 |
| 2014/0113088 A1 | 4/2014 | Goering | |
| 2017/0175308 A1 | 6/2017 | Provost et al. | |
| 2017/0266893 A1 | 9/2017 | Marin et al. | |

* cited by examiner ns of fiber
CONTOUR WEAVING TO FORM AIRFOIL

CROSS-REFERENCE TO RELATED APPLICATION

This application claims priority to U.S. Provisional Application No. 62/938,625 filed Nov. 21, 2019.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramics, such as ceramic matrix composite ("CMC") materials, are also being considered for airfoils. CMCs have high temperature resistance. Despite this attribute, there are unique challenges to implementing CMCs in airfoils.

SUMMARY

A method of fabricating an airfoil according to an example of the present disclosure includes drawing a continuous woven fabric ply over a contoured surface that has a geometry that is analogous to a geometry of an airfoil. The continuous woven fabric ply takes the geometry of the contoured surface to thereby form a contoured continuous woven fabric ply. An airfoil preform is then produced by wrapping the contoured continuous woven fabric ply around an airfoil tool. The airfoil tool has a geometry that is analogous to the airfoil. The contoured continuous woven fabric ply takes the geometry of the airfoil tool. The airfoil preform is then densified with a ceramic matrix to produce a ceramic matrix composite airfoil.

In a further embodiment of any of the foregoing embodiments, the contoured surface is on a roller.

In a further embodiment of any of the foregoing embodiments, the geometry of the airfoil includes a geometry of an airfoil section and a geometry of a platform.

In a further embodiment of any of the foregoing embodiments, the geometry of the contoured surface includes a cylindrical section that is analogous to the geometry of the airfoil section with respect to airfoil span.

In a further embodiment of any of the foregoing embodiments, the geometry of the contoured surface includes a conic section that is analogous to the geometry of the platform with respect to platform width.

In a further embodiment of any of the foregoing embodiments, the continuous woven fabric ply includes ceramic fiber bundles.

In a further embodiment of any of the foregoing embodiments, the continuous woven fabric ply is a harness satin weave having a harness number from 5 to 12.

In a further embodiment of any of the foregoing embodiments, the densifying includes at least one of chemical vapor infiltration, polymer infiltration and pyrolysis, and melt infiltration.

The method as recited in claim 1, wherein the geometry of the contoured surface includes a first section and a second section that form an angle that is from 150 degrees to 165 degrees.

In a further embodiment of any of the foregoing embodiments, the continuous woven fabric ply takes the geometry of the contoured surface by shifting orientations of fiber bundles in the continuous woven fabric ply and bending the fiber bundles in the continuous woven fabric ply.

A method of fabricating an airfoil according to an example of the present disclosure includes providing a continuous woven fabric ply, providing a roller that has a geometry that is analogous to a geometry of an airfoil section of an airfoil and to a geometry of a platform of the airfoil, and drawing the continuous woven fabric ply over the roller to cause the continuous woven fabric ply to conform to, and retain, the geometry of the roller and thereby produce a contoured continuous woven fabric ply coming off of the roller. The contoured continuous woven fabric ply has a first ply geometry that is analogous to the geometry of the airfoil section and a second ply geometry that is analogous to the geometry of the platform. An airfoil tool has a geometry that is analogous to the airfoil. An airfoil preform is then produced by wrapping the contoured continuous woven fabric ply around the airfoil tool. The contoured continuous woven fabric ply takes the geometry of the airfoil tool. The airfoil preform is then densified with a ceramic matrix to produce a ceramic matrix composite airfoil.

In a further embodiment of any of the foregoing embodiments, the geometry of the roller includes a first section that is analogous to the geometry of the airfoil section with respect to airfoil section span.

In a further embodiment of any of the foregoing embodiments, the geometry of the roller includes a second section that is analogous to the geometry of the airfoil section with respect to platform width.

In a further embodiment of any of the foregoing embodiments, the first ply geometry is analogous to the geometry of the airfoil section with respect to airfoil section span.

In a further embodiment of any of the foregoing embodiments, the second ply geometry is analogous to the geometry of the platform with respect to platform width.

In a further embodiment of any of the foregoing embodiments, the first tool geometry is analogous to the geometry of the airfoil section with respect to airfoil section span.

In a further embodiment of any of the foregoing embodiments, the second tool geometry is analogous to the geometry of the platform with respect to platform width.

An airfoil according to an example of the present disclosure includes an airfoil piece that has a continuous wall that defines an airfoil section. The airfoil section has a leading end, a trailing end, a suction side, and a pressure side. At least one platform extends from the airfoil section. The continuous wall is formed of a ceramic matrix composite having a ceramic matrix and a woven fabric ply disposed in the ceramic matrix. The woven fabric ply continuously and smoothly extends through the at least one platform and the leading end, the trailing end, the suction side, and the pressure side of the airfoil section.

In a further embodiment of any of the foregoing embodiments, the woven fabric ply is a harness satin weave having a harness number from 5 to 12.

In a further embodiment of any of the foregoing embodiments, the woven fabric ply wraps continuously from the trailing end at the suction side, through the suction side, around the leading end, through the pressure wide, and to the pressure side of the trailing end.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
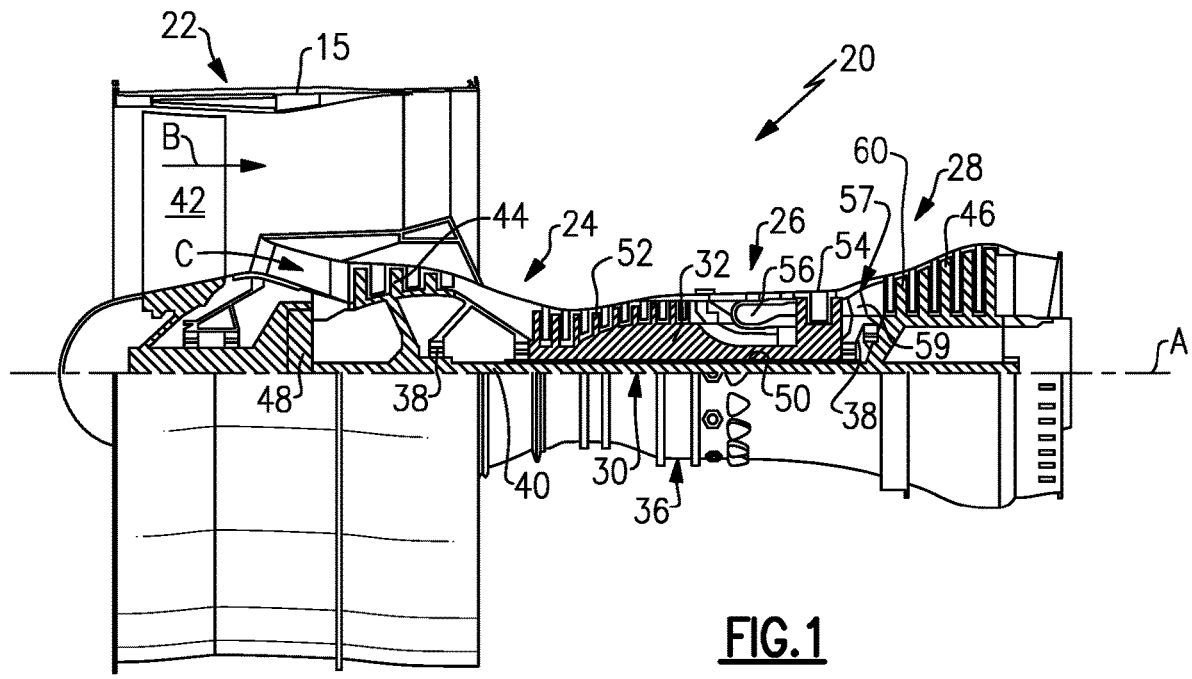
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
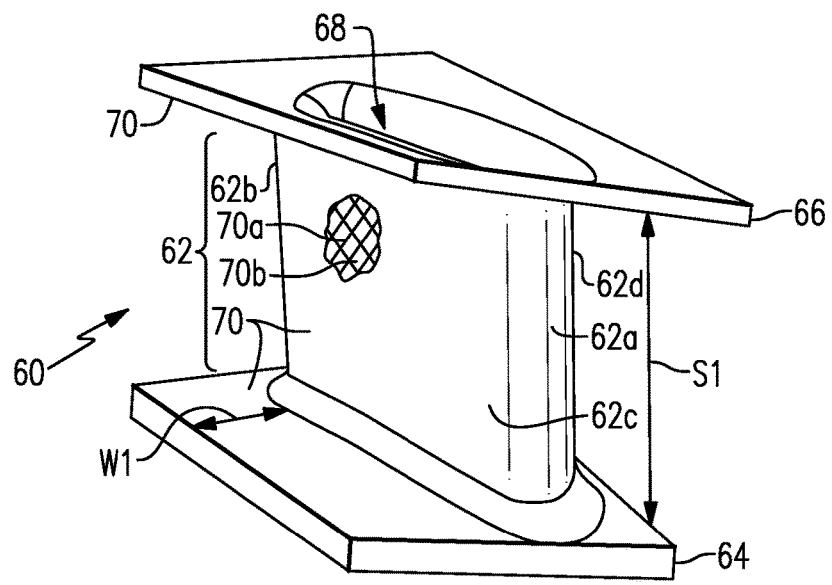
FIG. 2 illustrates an airfoil of the engine.

FIG. 2 illustrates a representative airfoil 60 used in the turbine engine 20 (see also FIG. 1). As shown, the airfoil 60 is a turbine vane; however, it is to be understood that, although the examples herein may be described and shown with reference to turbine vanes, this disclosure is also applicable to blades.

In the illustrated example, the airfoil 60 includes an airfoil section 62 that delimits an aerodynamic profile. Airfoil section 62 defines a leading end 62a, a trailing end 62b, and first and second sides 62*c*/62*d* that join the leading end 62*a* and the trailing end 62*b*. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa. In this example, the first side 62*c* is a pressure side and the second side 62*d* is a suction side. The airfoil section 62 generally extends in a radial direction relative to the central engine axis A. For a vane, the airfoil section 62 spans from a first or inner platform 64 to a second or outer platform 66. The terms "inner" and "outer" refer to location with respect to the central engine axis A, i.e., radially inner or radially outer. For a blade, the airfoil section 62 would extend from a single inner platform to a free end.

The airfoil section 62 circumscribes an interior cavity 68, which may receive cooling air, such as bleed air from the compressor section 24. The cooling air may be provided through a port or ports in one or both of the platforms 64/66.

The airfoil section 62 and platforms 64/66 together constitute an airfoil piece. For a blade, the airfoil piece would include only the airfoil section 62 and platform 64. The airfoil piece is formed of a single, continuous wall 70 that defines the complete or substantially complete shape and contour of the airfoil section 62 and platforms 64/66. In this regard, the airfoil 60 is a unibody construction.

The wall 70 is formed of a ceramic matrix composite ("CMC") or combinations of CMCs and monolithic ceramics. CMCs are comprised of a ceramic reinforcement, which is usually ceramic fibers, in a ceramic matrix. Example ceramic matrices of the CMC are silicon-containing ceramic, such as but not limited to, a silicon carbide (SiC) matrix or a silicon nitride ($Si_3N_4$) matrix. Example ceramic reinforcement of the CMC are silicon-containing ceramic fibers, such as but not limited to, silicon carbide (SiC) fiber or silicon nitride ($Si_3N_4$) fibers.

As shown in a cutaway section in FIG. 2, one example CMC is a SiC/SiC CMC in which SiC fiber bundles 70*a* are disposed within a SiC matrix 70*b*. The fiber bundles 70*a* are provided in one or more woven fabric plies, which are formed into the shape of the airfoil piece. The wall 70 is therefore comprised of at least one CMC ply and in some examples includes multiple CMC plies, such as two, three, or four plies.

In general, airfoils have relatively complex 3-dimensional shapes and contours on the airfoil section and the platform or platforms. These shapes and contours include radii of curvature at the filet between the airfoil section and the platform, surface contours, curvature at the leading end, and contours at the trailing end. Together, these types of shapes and contours challenge the process of forming woven fabric plies into the desired shape of the airfoil. For instance, the fiber bundles of the plies may lock-up and prevent or inhibit forming a tight curve, or the fiber bundles may wrinkle or buckle, leading to undesired discontinuities in the final CMC. This challenge may be exacerbated for relatively coarse ceramic fabrics that are often used for CMCs. The locking, wrinkling, and buckling may be mitigated to some extent by practices such as darting and sliting the fabric. However, even with darting and sliting, the fabric still cannot be formed with a continuous, smooth contour over the full geometry of an airfoil, as there are still some discontinuities (folds, buckles, wrinkles, etc.) and surface imperfections, as well as fiber discontinuity from the cutting of the fibers. In this regard, as will be described below, a method is disclosed in which a woven fabric ply is predisposed by a contouring process to facilitate forming the airfoil 60 with reduced need for darting/sliting and in some cases to form a single, continuous wall of smooth profile (free of folds, buckles, and wrinkles). In instances where more extreme contouring is desired, darting/sliting may be used to aid contouring that would otherwise be challenging to achieve.

Figure 3:
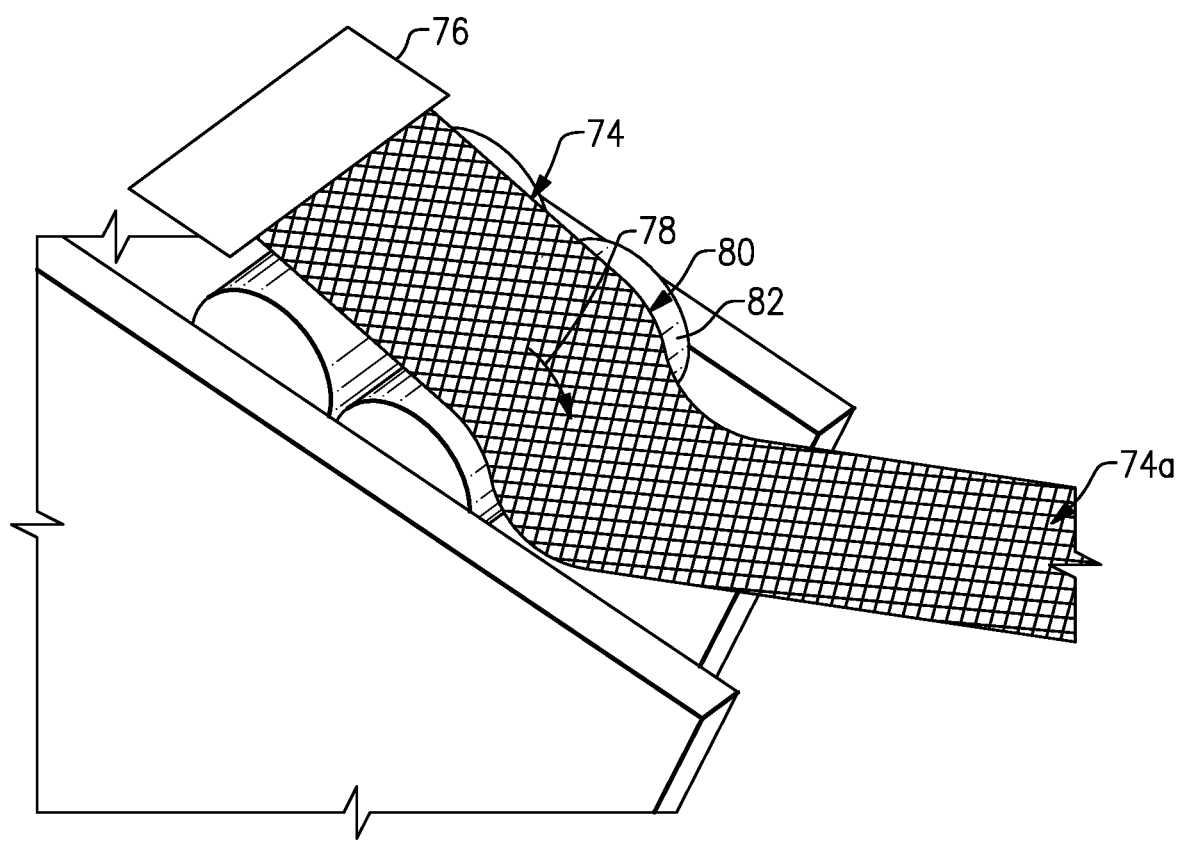
FIG. 3 illustrates a process for contouring a woven fabric ply for the fabrication of the airfoil.

Referring to FIG. 3, the method includes contouring a continuous woven fabric ply 74 (hereafter "ply 74"). As shown, the method is conducted at the take-off of the ply 74 from a loom 76. It is to be understood, however, that the method is not necessarily limited to loom take-off and may instead be provided from a fabric roll or other stock fabric. As indicated by arrow 78, the ply 74 is drawn over a contoured surface 80. A known take-up device, such as a powered spindle, may be used to draw the ply 74 over the contoured surface 80. For example, the ply 74 is drawn with tension such that the ply 74 is taut over the contoured surface. Although not shown, various guide bars may be employed above and/or below the ply 74 to facilitate the drawing of the ply 74 over the contoured surface 80.

Figure 4:
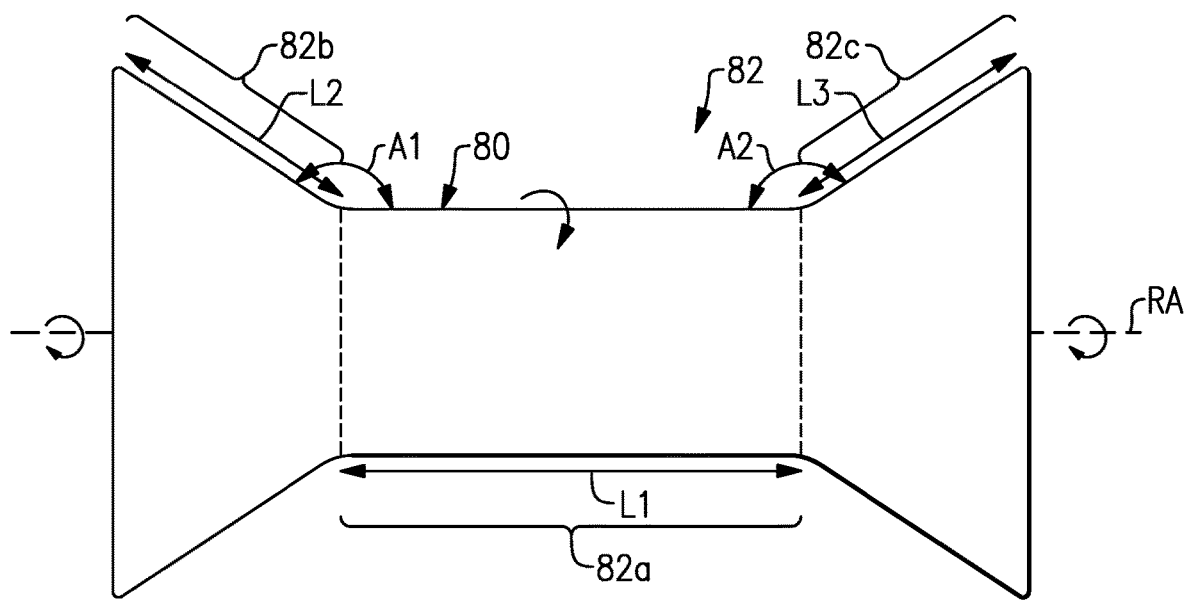
FIG. 4 illustrates a roller that has a contoured surface for contouring the woven fabric ply.

In this example, the contoured surface 80 is on a roller 82, which is shown in an isolated view in FIG. 4. The roller 82 is rotatable about a roller axis (RA) as the ply 74 is drawn over the roller 82.

The contoured surface 80 of the roller 82 has a geometry that is analogous to the geometry of the airfoil 60 in order to contour the ply 74 so that it is predisposed to the geometry of the airfoil 60. For instance, the roller 82 includes a first section 82*a*, a second section 82*b*, and an optional third section 82*c* (used for a vane, excluded for a blade). The sections 82*a*/82*b*/82*c* are generally geometrically distinct from one another in terms of the profile shape and/or surface contour. One or more of the sections 82*a*/82*b*/82*c* has a geometry that is analogous to the geometry of the airfoil 60.

In this example, the section 82*a* corresponds to the airfoil section 62 of the airfoil 60, the section 82*b* corresponds to the platform 64, and the section 82*c* corresponds to the platform 66. The term "corresponds" generally refers to the sections 82*a*/82*b*/82*c* being geometrically adapted to contour the ply 74 to the geometries of the respective airfoil section 62, platform 64, and platform 66. More specifically, "corresponds" also refers to analogous geometries between one or more of the sections 82*a*/82*b*/82*c* and the respective airfoil section 62, platform 64, and platform 66. For instance, one or more geometric characteristics of the sections 82*a*/82*b*/82*c* is analogous to one or more geometric characteristics of the respective airfoil section 62, platform 64, and platform 66. It is to be appreciated that analogous geometries need not be identical in all geometric aspects, provided that the analogous geometries share one or more geometry characteristics, such as geometry characteristics that are specific to the airfoil 60 geometry. The geometric characteristics are also referred to herein simply as geometries and may include lengths, widths, curvatures, and the like. Thus, one or more of the sections 82*a*/82*b*/82*c* has a geometry in terms of length, width, curvature, etc. that is specific to the geometry of the airfoil section 62, platform 64, and/or platform 66.

The following description demonstrates examples of analogous geometries, although it is to be understood that the examples may be used individually with other geometries and/or applied to other geometric characteristics. In FIG. 4, the first section 82*a* is cylindrical, and the sections 82*b*/82*c* are conic, although the conic geometries of sections 82*b*/82*c* may differ from each other. As will be appreciated, the cylindrical and conic shapes may be varied in accordance with the geometry of the airfoil 60. For instance, the section 82a may have an ellipsoid shape or shape that mimics the surface contour of the airfoil section 62. Example configurations of section 82b-section 82a-section 82c include, but are not limited to, cone-cylinder-cone, conic-ellipsoid-conic, and conic-airfoil surface contour-conic.

The cylinder of the section 82a defines a length L1. The airfoil section 62 also defines an airfoil section span S1 (FIG. 2). The length L1 of the first section 82a is analogous to the span S1 in that L1 is equal to S1 or substantially equal to S1 taking into account ply thicknesses. Similarly, the conic second section 82b defines a side length L2. The platform 64 defines a platform width W1 (FIG. 2), which is the maximum distance between the circumferential edge of the platform 64 and the first side 62c of the airfoil section 62. The length L2 of the second section 82b is analogous to the platform width W1 in that L2 is equal to or greater than W1. For example, L2 is greater than W1 by a margin distance in order to ensure that there is enough surface on the second section 82b to receive the full lateral extent of the ply 74. The third section 82c will likewise define a side length L3 that is analogous to the maximum platform width on the second side 62d of the airfoil section 62 (not shown). It is to be appreciated from the examples above that the sections 82a/82b/82c may additionally or alternatively have other geometries that are analogous to other geometries of the airfoil 60, such as but not limited to, surface contours.

Additionally, the sections 82a/82b/82c are configured at angles A1/A2 to one another. The angle A1 is the angle between the first section 82a and the second section 82b. The angle A2 is the angle between the first section 82a and the third section 82c. If the surfaces are contoured, the angles are determined from a local tangent line or lines at the respective corners. The angles A1/A2 serve to contour the ply 74 for predisposed bending at the filet of the airfoil 60 between the airfoil section 62 and the platforms 64/66. As an example, the angles A1/A1 are from 150 degrees to 165 degrees, and the angles A1/A1 may be equal or unequal. The angles A1/A2 represent a bend angle of the ply 74, i.e. an angle A1/A2 of 165 degrees represents a bend of 15 degrees in the ply 74 and an angle A1/A2 of 150 degrees represents a bend of 30 degrees in the ply 74. For relatively coarse ceramic fabrics that are of interest for the airfoil 60, such as SiC fiber bundles 70a, bends of more than approximately 30 degrees increase the chances of buckling in the fiber bundles 70a, while bends of less than approximately 15 degrees increase the chances that the ply 74 is not predisposed to a degree at which it can bend at the filet of the airfoil 60 without buckling.

As the ply 74 is drawn over the contoured surface 80, the ply 74 takes the geometry of the contoured surface 80 to thereby form a contoured continuous woven fabric ply 74a (FIG. 3; hereafter "contoured ply 74a"). For instance, the drawing of the ply 74 over the contoured surface 80 causes the ply 74 to conform to, and retain, the geometry of the contoured surface 80 and thereby produce the contoured ply 74a.

The ply 74 conforms to, and retains, the geometry of the contoured surface 80 via shifting local orientations or paths of the fiber bundles 70a in the ply 74 and local bending of the fiber bundles 70a as the ply 74 is drawn taut over the contoured surface 80. For instance, the orientation of weft fiber bundles 70a are initially parallel to each other and perpendicular to warp fiber bundles 70a but are locally shifted to non-parallel and non-perpendicular orientations, respectively.

Figure 5:
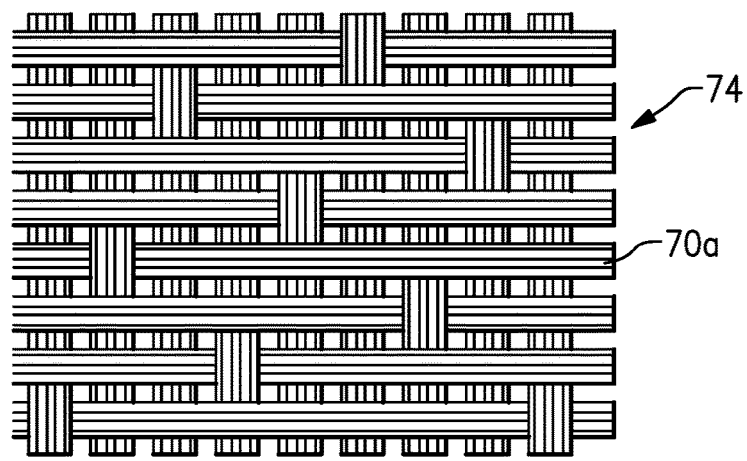
FIG. 5 illustrates a woven fabric ply that has a harness satin weave.

In this regard, the ply 74 is provided with a weave pattern that permits the fiber bundles 70a to have mobility. For instance, harness satin weaves provide good mobility. An example of the ply 74 with a harness satin weave is shown in FIG. 5. Harness satin weaves are those in which four or more weft fiber bundles pass over a warp fiber bundle, and four or more warp fiber bundles pass under a single weft fiber bundle. In further examples, the ply 74 is a harness weave and has a harness number from 5 to 12 (e.g., 8 harness weave or 12 harness weave). For a harness number of 5, four weft fiber bundles pass over a warp fiber bundle, and four warp fiber bundles pass under a single weft fiber bundle. In other words, the number of fiber bundles passed over/under is one less than the numeral of the harness number.

When fiber bundles pass over/under one another, the fiber bundles locally hinder each other from moving. However, the passing over/under of multiple fiber bundles locally reduces such hindering, freeing the fiber bundles to be more mobile. Variations of harness satin weaves or other weave patterns may be used, provided that the fiber bundles have mobility to shift and bend when the ply 74 is drawn taut over the contoured surface 80. Once shifted or bent into the contoured ply 74a, the fiber bundles 70a retain the contour when the contoured ply 74a comes off of the contoured surface 80. For subsequent steps in forming the airfoil 60, the contoured ply 74a may be cut to desired sizes as it comes off of the contoured surface 80. Alternatively, the contoured ply 74a may be taken up on a storage roll and then cut to the desired size at a later time.

Figure 6:
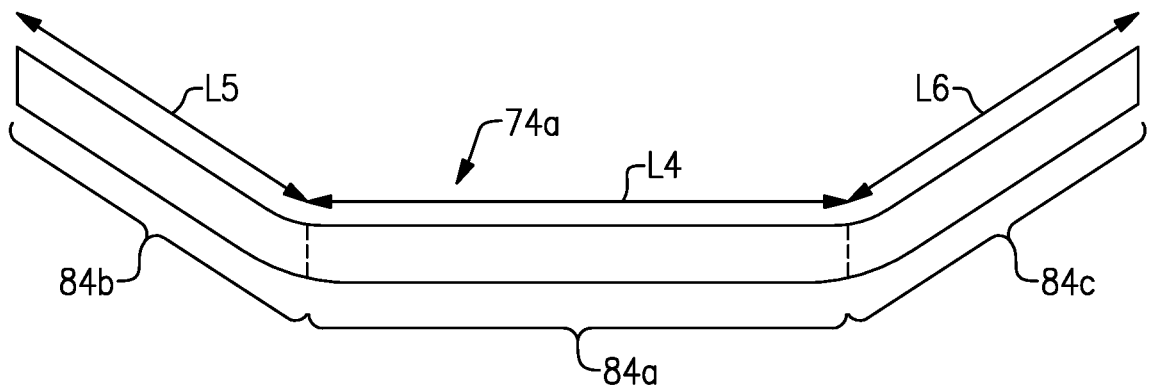
FIG. 6 illustrates a woven fabric ply after contouring.

FIG. 6 illustrates a cross-sectional view of the contoured ply 74a. The shape taken by the contoured ply 74a from the geometry of the contoured surface 80 is analogous to the geometry of the airfoil section 62 and to the geometry of the platforms 64/66 (or platform 64 for a blade). For instance, the contoured ply 74a has a first ply section 84a, a second ply section 84b, and a third ply section 84c. The first ply section 84a was contoured on the first section 82a of the roller 82, the second ply section 84b was contoured on the second section 82b of the roller 82, and the third ply section was contoured on the third section 82c of the roller 82. Similar to the analogous geometries between the contoured surface 80 and the airfoil 60, the ply sections 84a/84b/84c have geometries, imparted from the contoured surface 80, that are analogous to the geometries of the airfoil section 62, platform 64, and platform 66, respectively.

As an example, the ply section 84a has a length L4 (between sections 84b/84c), the ply section 84b has a length L5 (from section 84a to the ply edge), and the ply section 84c has a length L6 (from section 84a to the other edge). L4 is analogous to the airfoil section span S1 in that L4 is equal to S1, or substantially equal to S1 taking into account ply thicknesses. The length L5 is analogous to the platform width W1 in that L5 is equal to or greater than W1. For example, L5 is greater than W1 by a margin distance in order to ensure that there is sufficient amount of the ply 74a to form the full extent of the platform 64 on the side 62b. Similar to the the length L5, the length L6 is analogous to the maximum platform width on the second side 62d of the airfoil section 62 (not shown), plus a margin distance. It is to be appreciated from the examples above that the sections 84a/84b/84c may additionally or alternatively have other geometries that are analogous to other geometries of the airfoil 60, such as but not limited to, ply contours.

Figure 8:
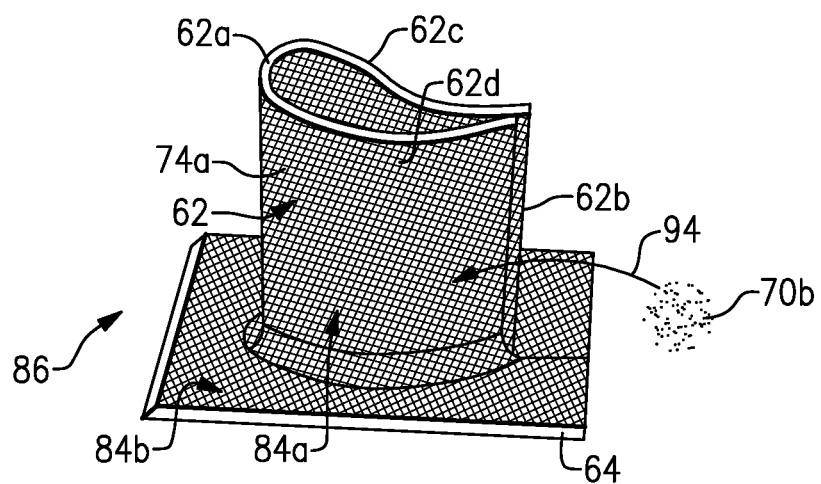
FIG. 8 illustrates the airfoil preform.
Figure 7:
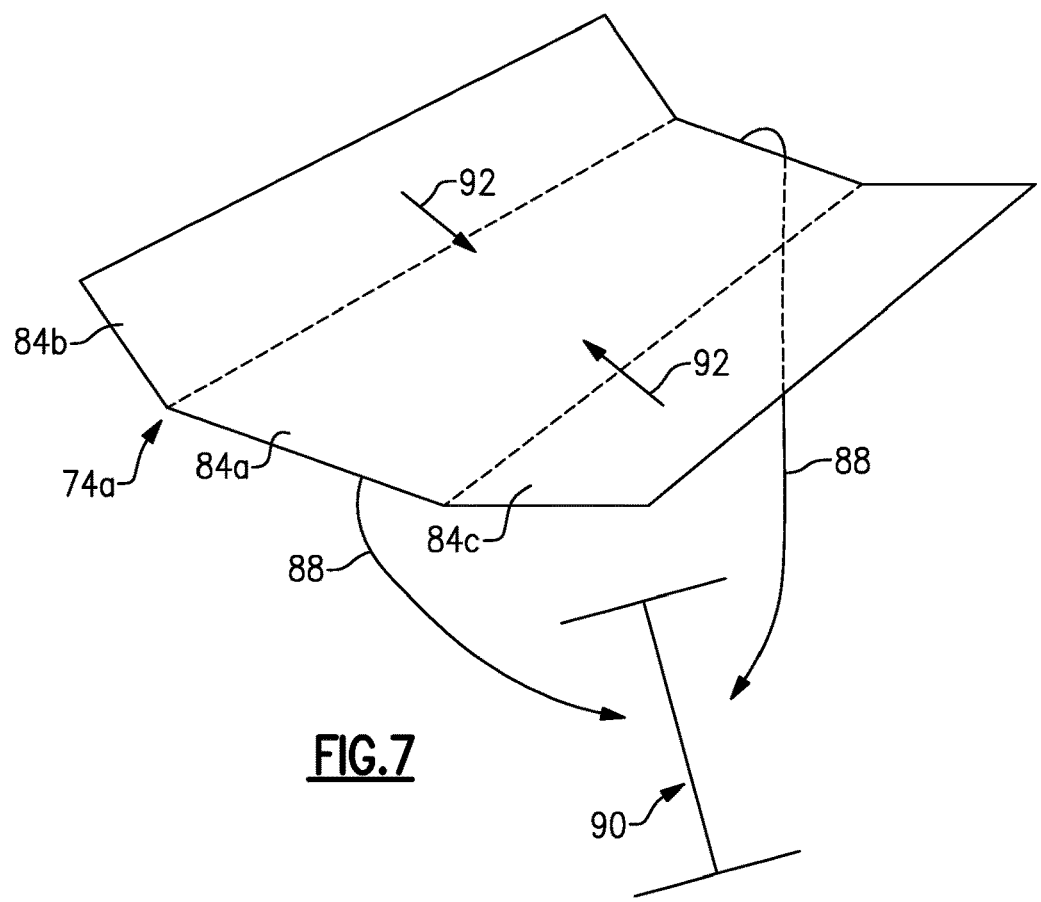
FIG. 7 illustrates a process of forming a contoured woven fabric ply into an airfoil preform.

FIG. 7 schematically depicts the forming of the contoured ply 74a into an airfoil preform 86, which is shown in an isolated view in FIG. 8 (in order to better observe the forming, the section 84c of the contoured ply 74a that formed the platform 66 is excluded from the view in FIG. 8). As indicated by arrows 88 in FIG. 7, the contoured ply 74a is wrapped, such as by bending or folding, around an airfoil tool 90 (represented schematically). For instance, the airfoil tool 90 at least has a tool section that has a geometry that is analogous to the geometry of the airfoil section 62 such that when wrapped, the section 84a of the contoured ply 74a takes the shape of the airfoil section 62. In this regard, the airfoil tool 90 may include a tube or the like that has the shape of a portion of or all of the airfoil section 62, such as a portion of the aerodynamic "wing" shape.

With regard to the wrapping, the opposed edges of the ply section 84a bend or fold toward each other, around the airfoil tool 90. As the contoured ply 74a is wrapped around the airfoil tool 90, the aforementioned edges of the section 84a are brought toward each other to form the trailing end 62b of the airfoil section 62. The sections 84b/84c fold or bend back toward the section 84a as indicated by arrows 92, e.g., to an orientation that is substantially perpendicular with the section 84a. The bending of the sections 84b/84c is along the contour line provided by the angles A1/A2 described above. The folding or bending of the sections 84b/84c may to some extent occur naturally due to pull when folding the section 84a and/or the sections 84b/84c are mechanically folded or bent. If the airfoil tool 90 has sections that correspond to the platforms 64/66, the sections 84b/84c are folded or bent to those sections. The extent of the sections 84b/84c of the contoured ply 74a is oversized from the desired shape of the platforms 64/66 and may thereafter be trimmed to the desired size. The ply 74a is wrapped at least once around the airfoil tool 90.

Figure 9:
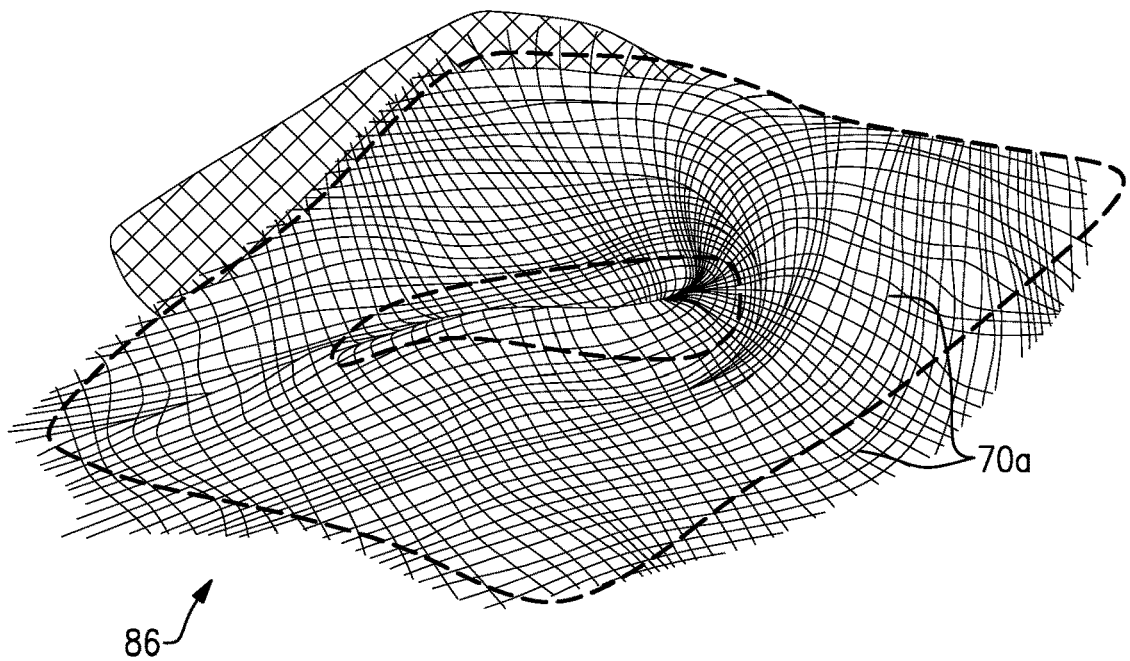
FIG. 9 illustrates fiber bundles of the airfoil preform.

FIG. 9 illustrates a radial view of the platform 64 of the airfoil preform 86. As shown, the fiber bundles 70a are curved and in non-perpendicular and non-parallel orientations, a portion of which may be due to fiber bundle movement during the forming of the ply 74a into the shape of the airfoil preform 86 and a portion of which is due to the contouring of the ply 74a on the contoured surface 80. The ply 74a also continuously and smoothly extends through the platforms 64/66 and the airfoil section 62, without discontinuities from buckling or wrinkling.

The pre-contouring of the contoured ply 74a using the contoured surface 82 prior to forming the ply 74a into the airfoil preform 86 facilitates the forming of the ply 74a into the geometry of the airfoil section 62 and platforms 64/66. For instance, the pre-contouring of the ply 74a predisposes the fiber bundles 70a to the desired end geometry of the airfoil 60. Thus, in comparison to a non-contoured ply, when the contoured ply 74a is wrapped around the airfoil tool 90, the fiber bundles 70a do not have to move or bend as much as the non-contoured ply would have to move or bend and are thus less likely to lock, wrinkle, or buckle. As a result, the contoured ply 74a continuously and smoothly takes the shape of the airfoil 60, as depicted by the lack of discontinuities in FIG. 8.

If desired, one or more additional plies 74a can be wrapped around the initial ply 74a to increase the wall thickness of the airfoil preform 86. Additionally or alternatively, a single ply 74a could be wrapped around the airfoil tool 90 more than once, such as two, three, or four wraps. Each subsequent ply 74a or wrap may be slightly larger than the prior ply 74a or wrap, to account for ply 74a thickness. Tackifiers or other agents may be applied in a known manner between the plies 74a or ply wraps to aid in formation, and the airfoil preform 86 may be subjected to debulking or other pre-densification steps as may be desired for a particular implementation.

Once the one or more plies 74a are formed into the airfoil preform 86, the ply or plies 74a are densified, as generally shown at 94 in FIG. 8. Densification is the process of providing the ceramic matrix 70b to form a solid body, i.e., the final or near final wall 70 of the airfoil 60. The densification 94 may include use of one or more known ceramic processing techniques, such as but not limited to, chemical vapor infiltration, polymer infiltration and pyrolysis, and melt infiltration. As these and other ceramic processing techniques are well known, they are not described further herein. The resulting solid wall 70 has a continuous and relatively smooth surface that is free of discontinuities due to fiber bundle buckles and wrinkles.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of fabricating an airfoil, the method comprising:
    drawing a continuous woven fabric ply over a contoured surface that has a geometry that is analogous to a geometry of an airfoil, the continuous woven fabric ply taking the geometry of the contoured surface to thereby form a contoured continuous woven fabric ply;
    producing an airfoil preform by wrapping the contoured continuous woven fabric ply around an airfoil tool, the airfoil tool has a geometry that is analogous to the airfoil, the contoured continuous woven fabric ply taking the geometry of the airfoil tool; and
    densifying the airfoil preform with a ceramic matrix to produce a ceramic matrix composite airfoil.

2. The method as recited in claim 1, wherein the contoured surface is on a roller.

3. The method as recited in claim 1, wherein the geometry of the airfoil includes a geometry of an airfoil section and a geometry of a platform.

4. The method as recited in claim 3, wherein the geometry of the contoured surface includes a cylindrical section that is analogous to the geometry of the airfoil section with respect to airfoil span.

5. The method as recited in claim 3, wherein the geometry of the contoured surface includes a conic section that is analogous to the geometry of the platform with respect to platform width.

6. The method as recited in claim 1, wherein the continuous woven fabric ply includes ceramic fiber bundles.

7. The method as recited in claim 1, wherein the continuous woven fabric ply is a harness satin weave having a harness number from 5 to 12.

8. The method as recited in claim 1, wherein the densifying includes at least one of chemical vapor infiltration, polymer infiltration and pyrolysis, and melt infiltration.

9. The method as recited in claim 1, wherein the geometry of the contoured surface includes a first section and a second section that form an angle that is from 150 degrees to 165 degrees.

10. The method as recited in claim 1, wherein the continuous woven fabric ply takes the geometry of the contoured surface by shifting orientations of fiber bundles in the continuous woven fabric ply and bending the fiber bundles in the continuous woven fabric ply.

11. A method of fabricating an airfoil, the method comprising:
providing a continuous woven fabric ply;
providing a roller that has a geometry that is analogous to a geometry of an airfoil section of an airfoil and to a geometry of a platform of the airfoil;
drawing the continuous woven fabric ply over the roller to cause the continuous woven fabric ply to conform to, and retain, the geometry of the roller and thereby produce a contoured continuous woven fabric ply coming off of the roller, the contoured continuous woven fabric ply having a first ply geometry that is analogous to the geometry of the airfoil section and a second ply geometry that is analogous to the geometry of the platform;
providing an airfoil tool that has a geometry that is analogous to the airfoil;
producing an airfoil preform by wrapping the contoured continuous woven fabric ply around the airfoil tool, the contoured continuous woven fabric ply taking the geometry of the airfoil tool; and
densifying the airfoil preform with a ceramic matrix to produce a ceramic matrix composite airfoil.

12. The method as recited in claim 11, wherein the geometry of the roller includes a first section that is analogous to the geometry of the airfoil section with respect to airfoil section span.

13. The method as recited in claim 11, wherein the geometry of the roller includes a second section that is analogous to the geometry of the airfoil section with respect to platform width.

14. The method as recited in claim 11, wherein the first ply geometry is analogous to the geometry of the airfoil section with respect to airfoil section span.

15. The method as recited in claim 11, wherein the second ply geometry is analogous to the geometry of the platform with respect to platform width.

16. The method as recited in claim 11, wherein the first tool geometry is analogous to the geometry of the airfoil section with respect to airfoil section span.

17. The method as recited in claim 11, wherein the second tool geometry is analogous to the geometry of the platform with respect to platform width.

18. An airfoil comprising:
an airfoil piece including a continuous wall defining
an airfoil section having a leading end, a trailing end, a suction side, and a pressure side, and
at least one platform extending from the airfoil section,
the continuous wall being formed of a ceramic matrix composite having a ceramic matrix and a woven fabric ply disposed in the ceramic matrix, the woven fabric ply continuously and smoothly extending through the at least one platform and the leading end, the trailing end, the suction side, and the pressure side of the airfoil section, wherein the woven fabric ply wraps continuously from the trailing end at the suction side, through the suction side, around the leading end, through the pressure side, and to the pressure side of the trailing end.

19. The airfoil as recited in claim 18, wherein the woven fabric ply is a harness satin weave having a harness number from 5 to 12.

20. The airfoil as recited in claim 18, wherein the woven fabric comprises a first ply edge at the trailing end and wraps from the first ply edge through the suction side, through the leading end, and through the pressure side to a second ply edge of the woven fabric ply at the trailing end opposite the first play edge.

* * * * *